United States Patent [19]
Bowling et al.

[11] Patent Number: 5,449,990
[45] Date of Patent: Sep. 12, 1995

[54] SINGLE CYCLE POSITIONING SYSTEM

[75] Inventors: Joseph M. Bowling, Boiling Springs; Michael D. Strong, Mechanicsburg, both of Pa.

[73] Assignee: The Whitaker Corporation, Wilmington, Del.

[21] Appl. No.: 52,882

[22] Filed: Apr. 26, 1993

[51] Int. Cl.⁶ ............................................. B66B 13/14
[52] U.S. Cl. .................................. 318/607; 318/127; 318/282
[58] Field of Search ............... 318/282, 122, 126, 127, 318/759, 607; 388/805, 814, 820, 832

[56] References Cited

U.S. PATENT DOCUMENTS

| | | | |
|---|---|---|---|
| 3,343,398 | 9/1967 | Kerns . | |
| 3,617,837 | 11/1971 | Beck | 318/762 |
| 4,250,442 | 2/1981 | McCammon | 318/723 |
| 4,340,848 | 7/1982 | Hanagata et al. | 318/696 X |
| 4,496,891 | 1/1985 | Kobayashi | 318/696 |
| 4,868,479 | 9/1989 | Byong-Ho et al. | 318/721 |
| 5,151,637 | 9/1992 | Takada et al. | 318/376 |
| 5,250,765 | 10/1993 | Mizuno et al. | 319/282 X |

*Primary Examiner*—William M. Shoop, Jr.
*Assistant Examiner*—Brian Sircus

[57] ABSTRACT

A single cycle positioning system utilizing a three phase wye connected induction motor (10) includes a three phase inverter (28) and a microprocessor (20) for controlling the inverter to generate three phases of power. Pulse width modulation techniques are utilized and in response to a start signal the frequency of the power to the motor is increased up to a running frequency, and in response to a stop signal the frequency of the power applied to the motor is decreased along with a corresponding reduction of the voltage applied to the motor.

7 Claims, 6 Drawing Sheets

| POINTER VALUE | PWM VALUE | POINTER VALUE | PWM VALUE | POINTER VALUE | PWM VALUE |
|---|---|---|---|---|---|
| 0 | 0 | 8 | 255 | 16 | 255 |
| 1 | 54 | 9 | 255 | 17 | 252 |
| 2 | 115 | 10 | 255 | 18 | 247 |
| 3 | 168 | 11 | 255 | 19 | 235 |
| 4 | 222 | 12 | 255 | 20 | 222 |
| 5 | 235 | 13 | 255 | 21 | 168 |
| 6 | 247 | 14 | 255 | 22 | 115 |
| 7 | 252 | 15 | 255 | 23 | 54 |

SINGLE CYCLE POSITIONING SYSTEM

BACKGROUND OF THE INVENTION

This invention relates to positioning systems and, more particularly, to an improved single cycle positioning system which utilizes an induction motor to accurately position a cyclicly movable member at a precise location within its movement cycle.

There are numerous machines where a member is cyclicly driven and it is required to stop the member at a precise location within its positional cycle. One such type of machine is a crimping press which is utilized repetitively to attach electrical terminals to the ends of wires. U.S. Pat. No. 3,343,398 discloses one such machine wherein a ram is coupled to a shaft and, during each single revolution of the shaft, the ram is moved downwardly and then back to its initial position thereby to move a crimping die on the end of the ram into engagement with a terminal. The shaft is coupled through a single revolution clutch to a flywheel which is continuously driven by a continuously operated motor. When it is desired to crimp a terminal onto a wire, the single revolution clutch is engaged to drive the shaft through a single revolution so that the ram is moved through its cycle.

While the aforedescribed arrangement is effective for its intended purpose, it suffers from a number of disadvantages. Thus, for example, the continuous running of the motor is wasteful of electrical energy and results in the generation of heat. Also, the use of a single revolution clutch causes noise and vibration. Further, the clutch has to be properly maintained and worn parts replaced.

It is therefore an object of the present invention to provide a single cycle positioning system which substitutes electronic control for a single revolution clutch.

Positioning systems utilizing servo motors are known. However, due to the type of motor required, such systems tend to be expensive. It is therefore another object of the present invention to provide a positioning system of the type described which utilizes a relatively inexpensive induction motor.

SUMMARY OF THE INVENTION

The foregoing, and additional, objects are attained in accordance with the principles of this invention by providing a single cycle positioning system which utilizes a three phase wye connected induction motor and comprises a source of DC power, a movable member coupled to the motor for controlled cyclical movement thereby, means for providing a start signal to initiate movement of the member, means associated with the member for providing a stop signal when the member is at a predetermined position within its cycle of movement, and controllable inverter means connected between the source of DC power and the three phase windings of the motor for selectively providing connections between the DC power source and the three phase windings of the motor. There is further provided control means which is coupled to receive the start signal and the stop signal for controlling the inverter means. The control means is effective in response to the start signal for controlling the inverter means so as to generate from the source of DC power three substantially sinusoidal phases of AC power which are applied to respective ones of the three phase windings of the motor. The control means is effective in response to the stop signal for controlling the inverter means to effect a dynamic braking of the motor so that the moveable member comes to rest at a desired position within a defined range of the predetermined position.

In accordance with an aspect of this invention, the control means is operative in response to the start signal for applying AC power to the motor at a frequency which increases up to a predetermined frequency, and thereafter maintaining the frequency of the AC power at the predetermined frequency until receipt of the stop signal.

In accordance with another aspect of this invention, the control means is operative in response to the stop signal for decreasing the frequency of the AC power applied to the motor down from the predetermined frequency.

In accordance with a further aspect of this invention, the control means is effective to maintain the voltage applied to the motor at a predetermined value from receipt of the start signal until receipt of the stop signal.

In accordance with yet another aspect of this invention, the control means is effective after receipt of the stop signal to reduce the voltage applied to the motor relative to the predetermined value as a function of the ratio of the applied frequency to the predetermined frequency.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1A:
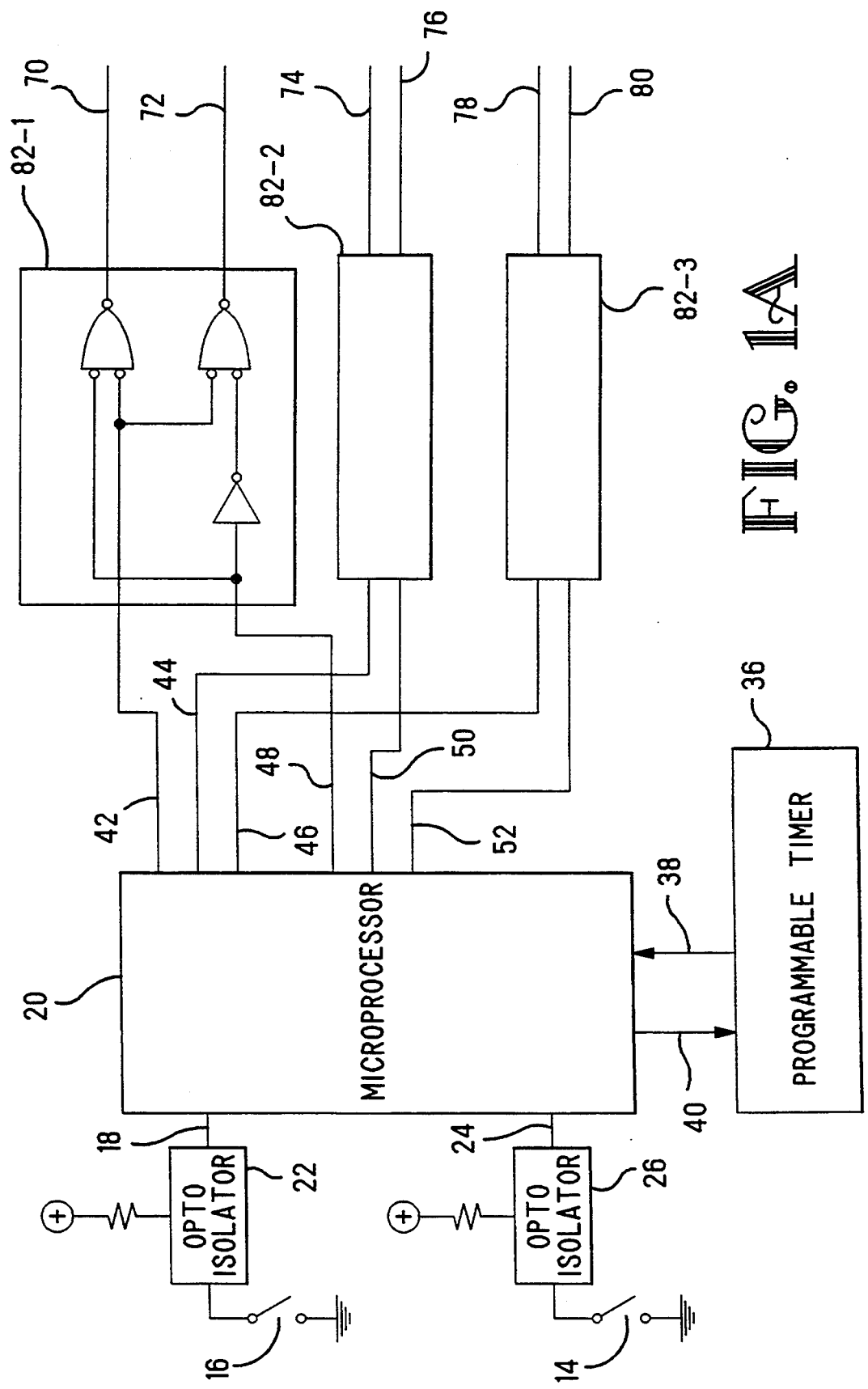
FIGS. 1A and 1B, when taken together, form a block diagram of an illustrative embodiment of a single cycle positioning system constructed in accordance with the principles of this invention.
Figure 1B:
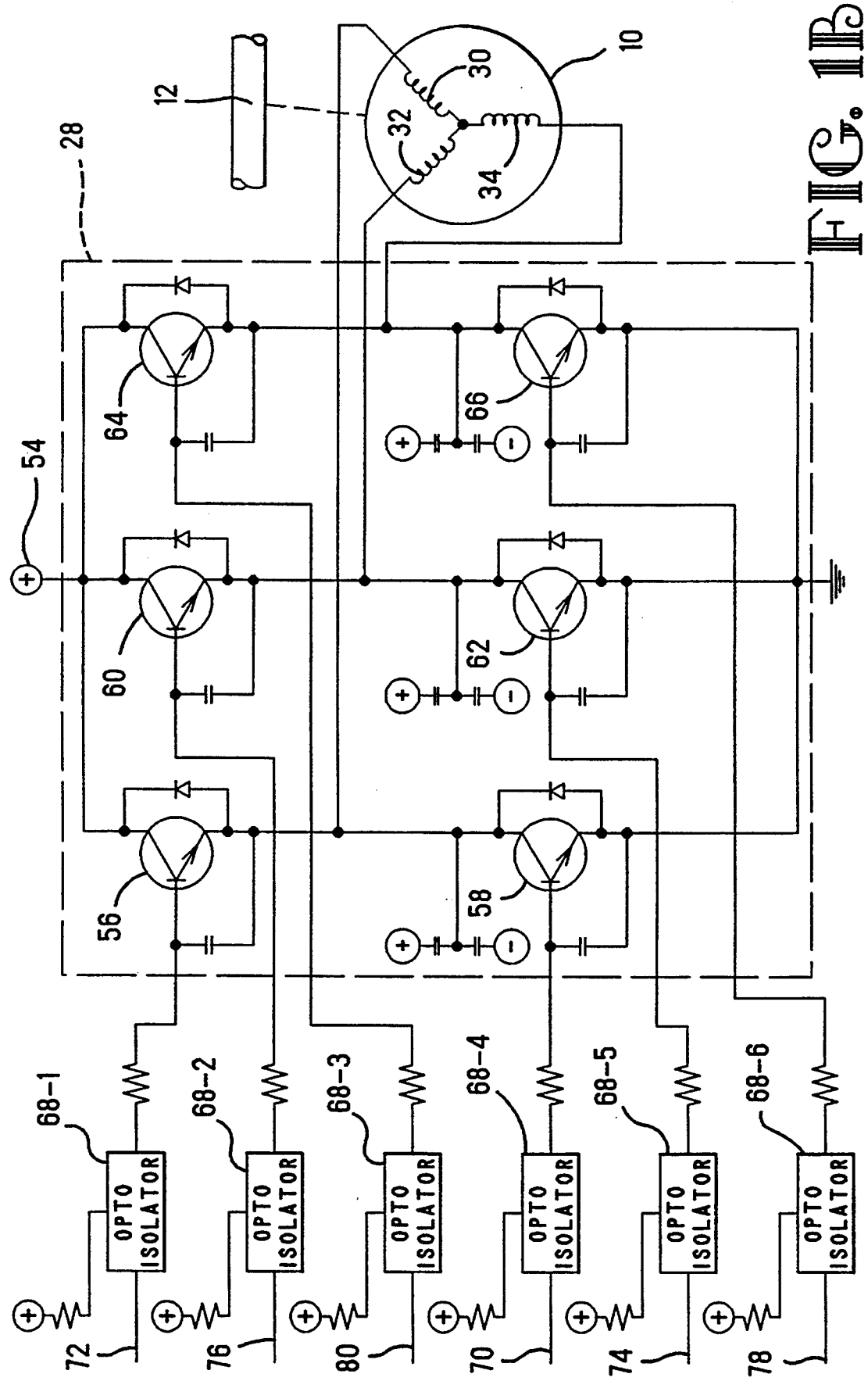

FIGS. 1A and 1B together show a system for controlling a three phase wye connected induction motor 10 so that a movable member coupled thereto, illustratively the shaft 12, partakes of a single cycle of movement. Thus, associated with the shaft 12 is a home switch 14 which is closed whenever the shaft 12 attains a predetermined angular orientation. As illustrated herein, the movable member is the shaft 12. However, it is understood that the movable member can be any type of member which is controlled by the motor 10 for cyclical movement, such as, for example, a reciprocatory element. Further, although the home switch 14 is illustrated as being a simple single pole single throw switch, other types of switches may also be utilized as the home switch 14 such as, for example, a magnetic reed switch or a Hall effect sensing device. In any event, there is a coupling mechanism, such as reduction gearing, between the motor 10 and the movable member 12 whereby the movable member 12 partakes of a single cycle of movement when the motor 10 makes some predetermined number of revolutions.

Movement of the member 12 is initiated in response to closure of the switch 16 which may be, illustratively, a foot operated switch when the disclosed system is utilized in the environment of a crimping press of the general type disclosed in the aforereferenced U.S. Pat. No. 3,343,398. Closure of the foot switch 16 results in the generation of a start signal on the lead 18 to the microprocessor 20 via the opto-isolator 22. Similarly, closure of the home switch 14 results in the generation of a stop signal on the lead 24 to the microprocessor 20 via the opto-isolator 26. As will be described hereinafter, the microprocessor 20 responds to the start and stop signals on the leads 18 and 24, respectively, to control the three phase inverter 28 to supply power to the three phase windings 30, 32 and 34 of the motor 10 so that the shaft 12 partakes of a single revolution.

The microprocessor 20 illustratively is a type 80C51FA microprocessor manufactured by Intel Corporation, which type of microprocessor has pulse width modulation capability built into it. Thus, within the microprocessor 20 are several dedicated pulse width modulation registers, three of which are utilized by the inventive system—one for each phase of the motor 10. Associated with each of those registers is a counter which is incremented by a clock. Illustratively, each of the registers and counters is 8 bits in length so that it contains a number from 0 through 255. The counter is configured so that in response to incoming clock pulses, it counts from 0 up to 255 and then rolls over to 0 again. At each clock pulse, the value that is in each register is compared to the count in the associated counter. If the count is less than or equal to the value in the register, then an associated pulse width modulation (PWM) output from the microprocessor 20 is low. When the count exceeds the value in the register, the associated PWM output goes high. In effect, each PWM output from the microprocessor 20 is a square wave whose duty cycle is determined by the value which had been preloaded into its associated register.

The clock pulses utilized for the aforedescribed pulse width modulation are provided by the programmable timer 36. The timer 36 illustratively is a type 82C54 programmable counting array manufactured by Intel Corporation. The programmable feature of the timer 36 is the frequency at which the clock pulses are provided on the lead 38. This frequency is determined by signals provided from the microprocessor 20 on the leads 40.

The aforedescribed PWM outputs from the microprocessor 20 appear on the leads 42, 44, and 46, for the three windings 30, 32 and 34, respectively, of the motor 10. As will be described in full detail hereinafter, the duty cycle square wave signals on the leads 42, 44 and 46 are utilized in conjunction with selection output signals on the leads 48, 50 and 52 to control the inverter 28.

The inverter 28 is connected to a DC power supply 54, illustratively 170 volts, and to the three phase windings 30, 32 and 34 of the motor 10. The inverter 28 includes three pairs of transistors, one pair for each of the windings 30, 32 and 34. Thus, associated with the winding 30 is a high transistor 56 and a low transistor 58; associated with the winding 32 is a high transistor 60 and a low transistor 62; and associated with the winding 34 is a high transistor 64 and a low transistor 66. To run the motor 10, either (1) one of the high transistors 56, 60 and 64 is turned on and two of the low transistors 58, 62 and 66 are turned on, or (2) one of the low transistors 58, 62 and 66 is turned on and two of the high transistors 56, 60 and 64 are turned on. However, at no time are both of the transistors in the pair associated with a particular one of the windings 30, 32 and 34 turned on simultaneously, because in that case there would be a short circuit across the DC supply 54. Thus, for example, a valid combination would be to turn on the transistors 56, 62 and 66. In that case, current would flow from the DC supply 54, through the transistor 56, through the winding 30, through the two windings 32 and 34, and through the transistors 62 and 66 to ground. By selectively controlling the transistors 56, 58, 60, 62, 64 and 66, a rotating magnetic field can be set up in the motor 10 to cause it to turn, as is well known in the art.

Opto-isolators 68-1, 68-2, 68-3, 68-4, 68-5 and 68-6 are provided to isolate the high voltages in the inverter 28 from the low control voltages. These control voltages are provided on the leads 70, 72, 74, 76, 78 and 80. The signals on the leads 72, 76 and 80 control the high transistors 56, 60 and 64, respectively, and the signals on the leads 70, 74 and 78 control the low transistors 58, 62 and 66, respectively.

The PWM output leads 42, 44 and 46 from the microprocessor 20 are connected to the router circuits 82-1, 82-2 and 82-3, respectively. The other inputs to the router circuits 82-1, 82-2 and 82-3 are the selection leads 48, 50 and 52, respectively, from the microprocessor 20. Thus, the signal on each of the selection leads 48, 50 and 52 determines which of the transistors in each pair for each winding (i.e., which of the transistors 56 and 58, which of the transistors 60 and 62, and which of the transistors 64 and 66) is turned on and the corresponding PWM output lead 42, 44 or 46 determines the conductive duty cycle.

The microprocessor 20, in accordance with an internally stored program and data, utilizes its inherent pulse width modulation capability to provide appropriate signals on its pulse width modulation output leads 42, 44 and 46 and on its selection leads 48, 50 and 52 to control the inverter 28 so that three substantially sinusoidal phases of AC power are applied to the three phase windings 30, 32 and 34 of the motor 10 to cause it to go from an at rest condition in response to a start signal on the lead 18 so as to move the shaft 12 through a single revolution. The foregoing is accomplished according to the present invention by controlling the motor 10 to run in three stages. The first stage is the acceleration stage; the second stage is the run stage; and the third stage is the deceleration stage.

Figure 5:
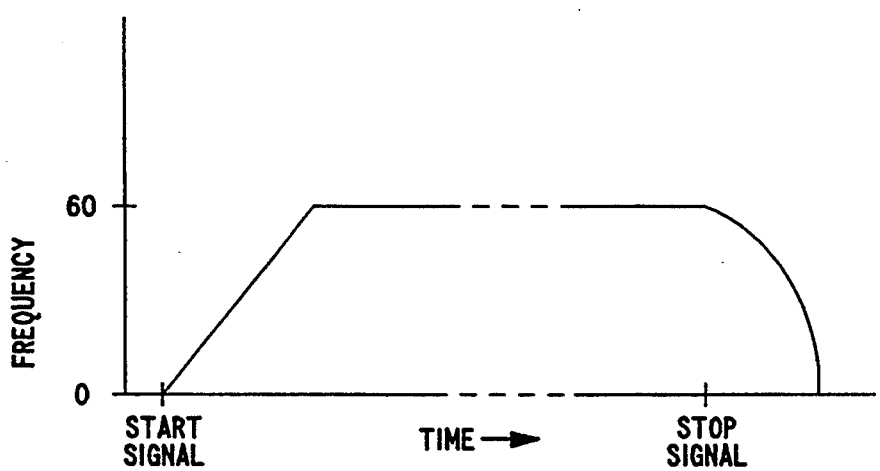
FIG. 5 illustrates the variation in the frequency of the AC power applied to the motor in accordance with the principles of this invention.

The motor 10 is rated to be supplied with three phase AC power at a frequency of 60 Hertz. It has been found that to accelerate the motor it is better to gradually increase the frequency of the AC power up to 60 Hertz rather than to immediately apply power at 60 Hertz. The motor's running speed is more quickly attained in this manner. Thus, as shown in FIG. 5, upon receipt of the start signal on the lead 18, due to closure of the foot switch 16, the frequency of the AC power applied to the motor 10 is gradually increased from 0 up to 60 Hertz. This is the acceleration stage. During the run stage, the frequency is maintained at 60 Hertz. The run stage terminates, and the deceleration stage begins, upon receipt of the stop signal on the lead 24 due to closure of the home switch 14.

Induction motors can be dynamically braked by fixing the internal magnetic field in space. However, it has been found that more predictable stopping is achieved with dynamic braking if the deceleration is controlled by reducing the frequency of the power applied to the motor 10. However, while the increase in frequency relative to time during the acceleration stage is substantially linear, the decrease in frequency relative to time during the deceleration stage preferably is substantially parabolic, as shown in FIG. 5. Generally, when an induction motor rated at a particular frequency is run at a lower frequency, the voltage is proportionately reduced. Thus, for example, if the motor 10 is a 60 Hertz 120 volts RMS motor running at 30 Hertz, it is conventional to reduce the voltage to 60 volts RMS. However, in accordance with this invention, it is contemplated that during the acceleration stage the voltage may not have to be reduced even though the frequency is less than the rated frequency. It is thought that this permits the motor 10 to come up to speed more quickly. However, during the deceleration stage, the motor voltage is reduced in proportion to the frequency.

Figure 6A:
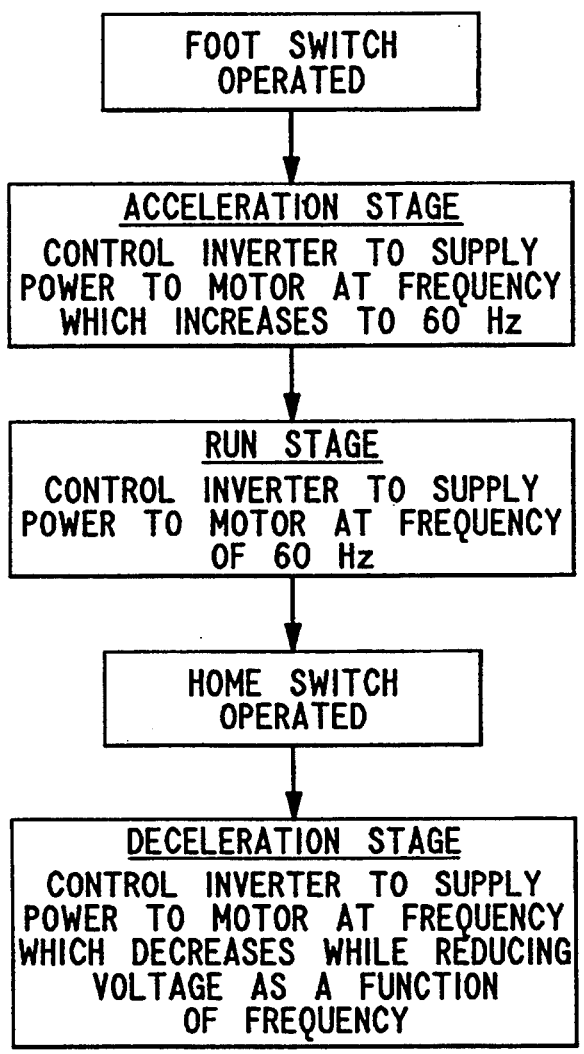
FIGS. 6A–6D are flow charts useful for understanding the operation of the system according to this invention.

FIG. 6A illustrates the overall operation of the system according to the present invention. Thus, after the foot switch 16 is operated, the system enters the acceleration stage where the inverter 28 is controlled to supply power to the motor 10 at a frequency which increases to 60 Hertz. Next, the system enters the run stage where the inverter 28 is controlled to supply power to the motor at 60 Hertz. The system remains in the run stage until the home switch 14 is operated. At that time, the system enters the deceleration stage where the inverter 28 is controlled to supply power to the motor 10 at a frequency which decreases while the voltage is reduced as a function of the frequency. The location of the home switch 14 relative to the stopping position of the shaft 12 is such that the deceleration stage causes the shaft 12 to stop within an acceptable tolerance of the desired position.

Figures 2, 3:
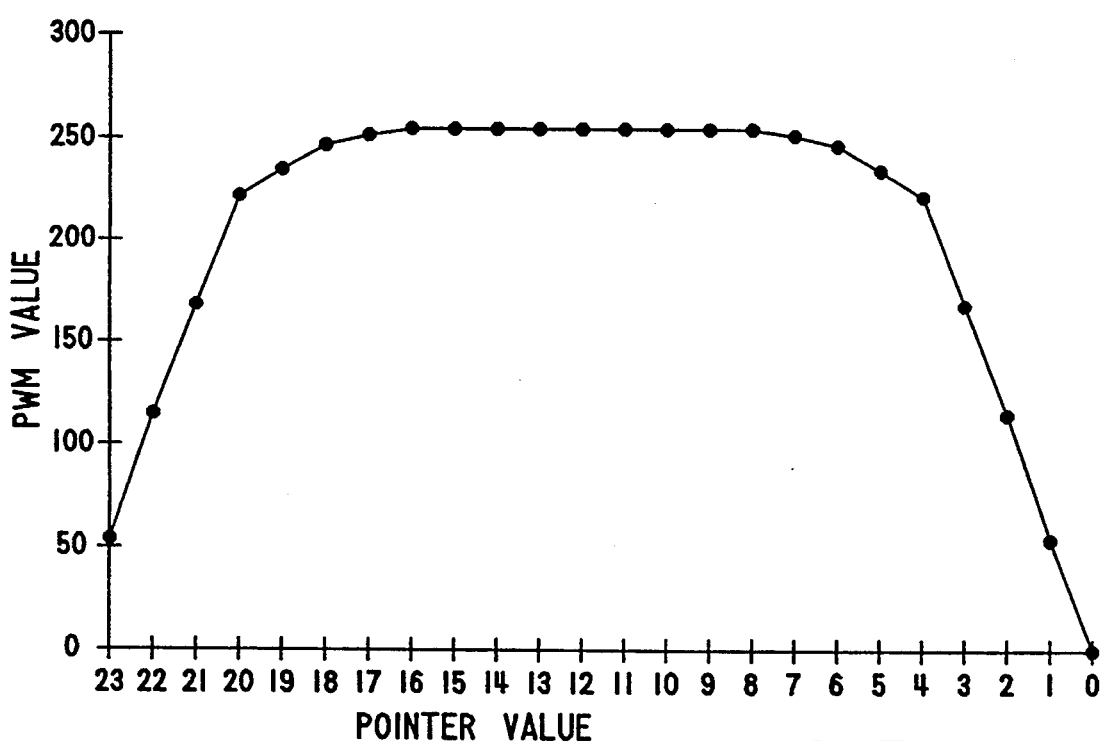
FIG. 2 shows a table of illustrative pulse width modulation values utilized in the system shown in FIG. 1.
FIG. 3 is a curve plotted in accordance with the values in the table of FIG. 2.

The duty cycles of the signals on the PWM output leads 42, 44 and 46 are determined in accordance with the table of FIG. 2 and the frequency of the power applied to the motor 10 is determined by the frequency of the clock pulses on the lead 38 from the timer 36, as programmed by the signals on the leads 40. Referring to FIG. 2, within the microprocessor 20 there is stored a pulse width modulation table with 24 ordered pulse width modulation (PWM) values. Each of those values is addressed in accordance with the value of a pointer, which can vary from 0 through 23. The PWM value determines duty cycle, and can vary from 0 to 255, with a value of 255 being equated with a 100% duty cycle. The microprocessor 20 sequences through the table of FIG. 2 by decrementing the pointer value and FIG. 3 is a curve showing the PWM value as a function of the pointer value. Thus, when the pointer value is 22, the PWM value is 115, which equates to a duty cycle of 45%.

Figure 4:
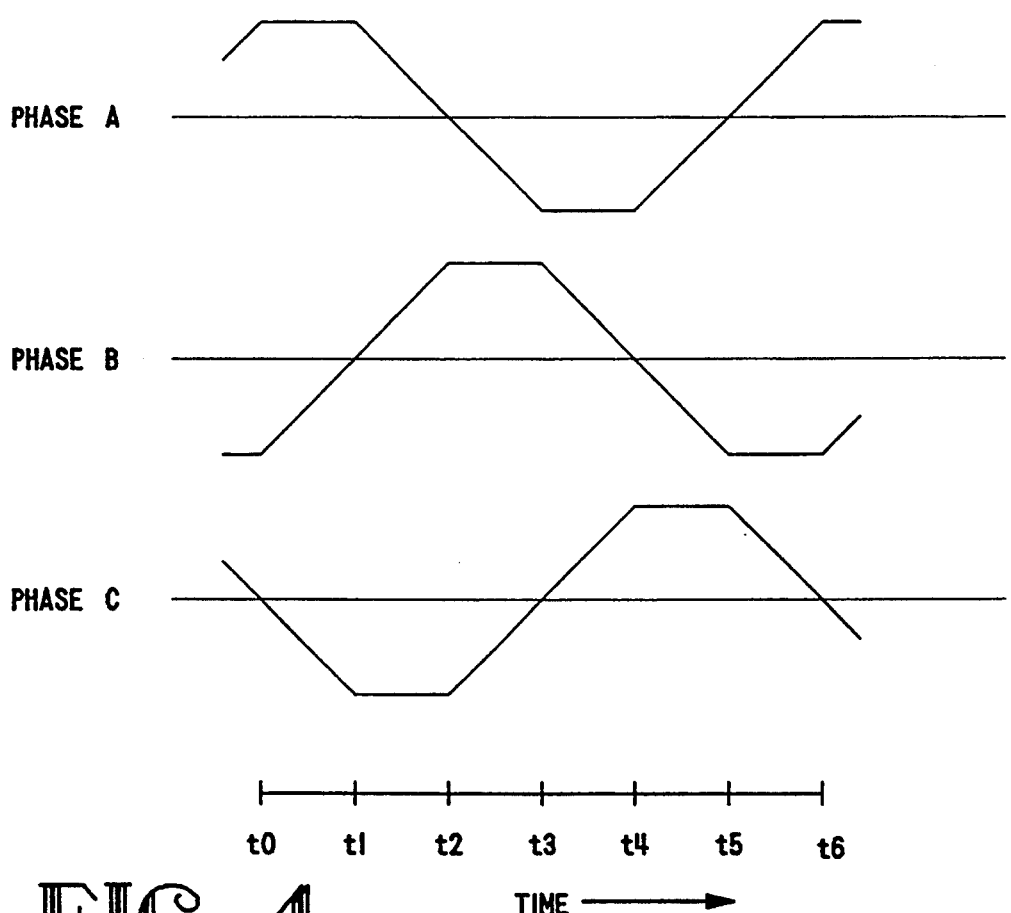
FIG. 4 schematically illustrates the form of the voltages applied to the three phases of the motor in accordance with the principles of this invention.

By sequencing through the table of FIG. 2 for each of the phases of the motor 10 and by selecting the appropriate high or low transistor for each of the motor windings, three substantially sinusoidal phases of AC power can be generated, as shown in FIG. 4. Each of the phases has its own pointer. Between the times $t_0$ and $t_1$, for phase A (i.e., the winding 30), the A pointer is decremented from 15 to 8 and the high transistor is turned on fully. During that same time, for phase B the B pointer is decremented from 7 to 0 and the low transistor is turned on and pulse width modulated in a decreasing manner. For phase C, the C pointer is decremented from 23 to 16 and the low transistor is turned on and pulse width modulated in an increasing manner. Then, for the time from $t_1$ to $t_2$, for phase A the A pointer is decremented from 7 to 0 and the high transistor is turned on and pulse width modulated in a decreasing manner. For phase B, the B pointer is decremented from 23 to 16 and the high transistor is turned on and pulse width modulated in an increasing manner. For phase C, the C pointer is decremented from 15 to 8 and the low transistor is turned on fully. This operation continues so as to generate the three substantially sinusoidal phases of AC power.

Figure 6B:
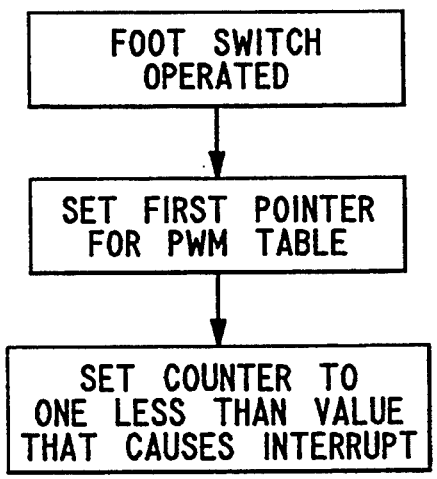

As previously discussed, the microprocessor 20 includes a pulse width modulation counter and several pulse width modulation registers, of which three are utilized. In response to clock pulses on the lead 38 from the timer 36, the counter counts up from 0 to 255. In response to the next clock pulse the counter rolls over to 0 and at the same time generates an interrupt signal. As shown in FIG. 6B, when the foot switch 16 is operated, the microprocessor 20 sets an initial pointer value for each of the three phases. Since the three phases must be offset by 120 degrees, the initial pointer values are staggered one third of the way through the table of FIG. 2. Thus, illustratively, the initial pointer value for phase A may be 15, the initial pointer value for phase B may be 7, and the initial pointer value for phase C may be 23. At the same time that the initial pointer values are set, the PWM counter is set to one less than the value that causes an interrupt signal to be generated. Thus, the PWM counter is set to 2.55.

Figure 6D:
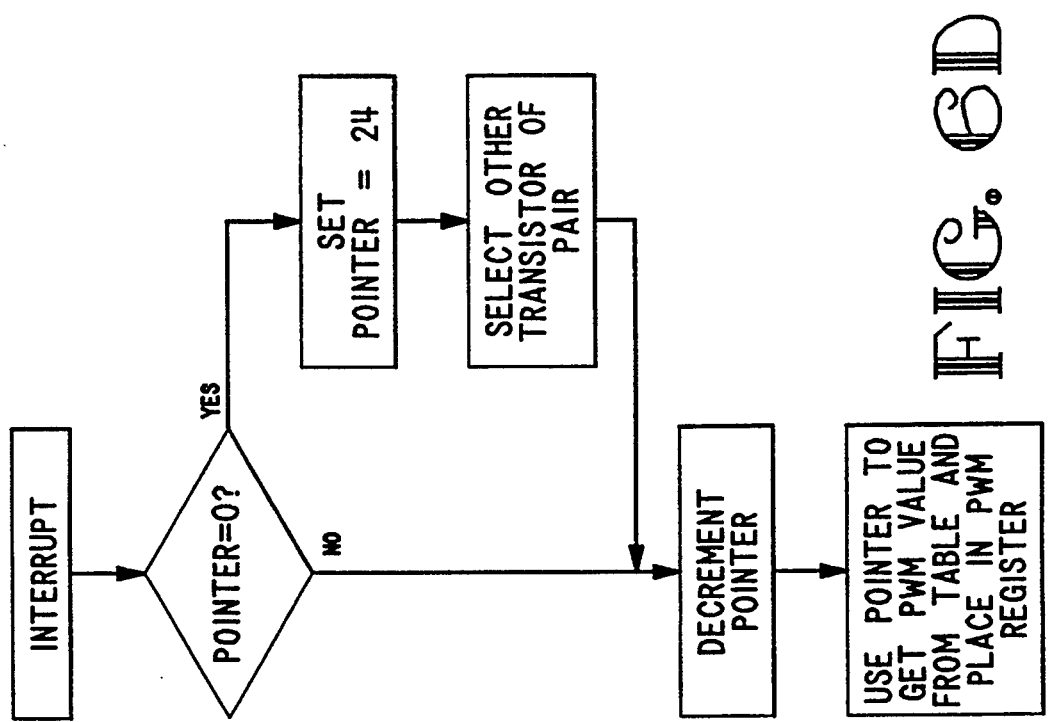
Figure 6C:
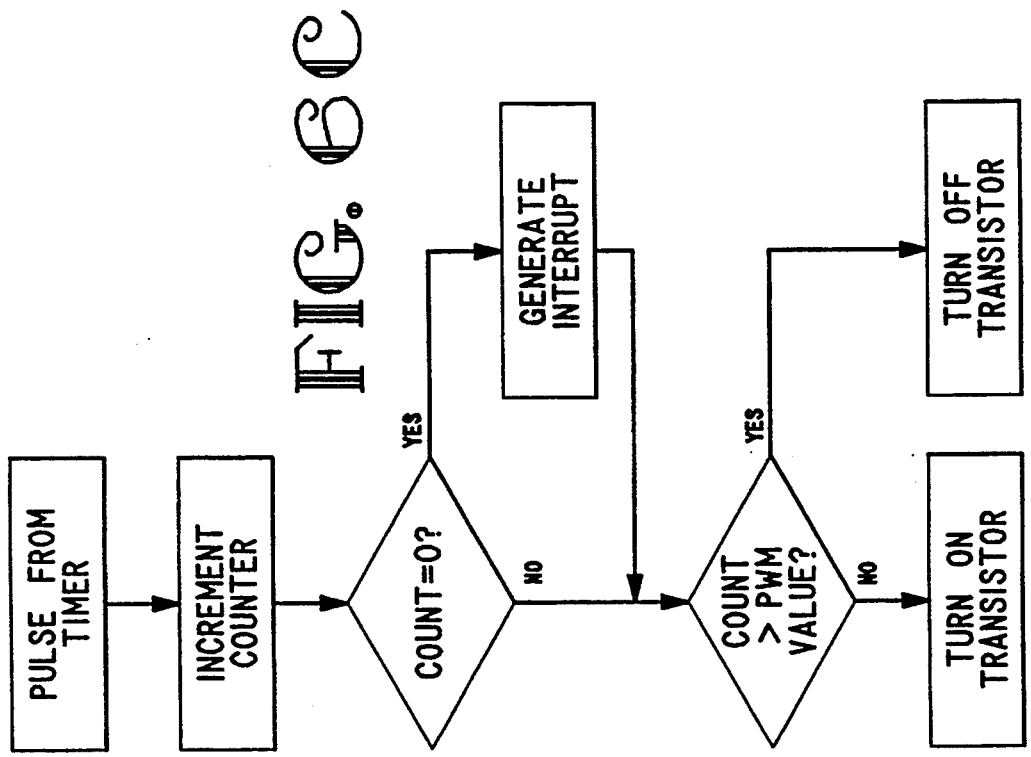

FIG. 6C illustrates, for one of the phases, how the pulse width modulation operates. When a pulse is received on the lead 38 from the timer 36, the PWM counter is incremented. A check is made to see if the count is 0. If yes, then the interrupt signal is generated. In any case, the count is compared with the PWM value that is stored in the PWM register. If the count is greater than the PWM value, the transistor that had been on for that phase is turned off. If the count is not greater than the PWM value, then the selected transistor for that phase is controlled to be conductive.

FIG. 6D illustrates how the PWM value is obtained and placed in the PWM register. Upon the occurrence of an interrupt signal, the pointer is checked to see if it is 0. If the pointer is 0, it is set to 24 and the other transistor of the pair for that phase is selected. Then the pointer is decremented. If the pointer had not been equal to 0, then it is merely decremented. The pointer is used to obtain the PWM value from the table of FIG. 2. The PWM value is then placed in the PWM register.

In summary, each cycle of the AC power is divided into 48 steps. During those 48 steps, the pointer sequences through the table of FIG. 2 twice, once with one of the transistors of each phase pair selected and once with the other transistor of each phase pair selected. Each of those 48 steps is itself subdivided into 256 parts and the selected transistor is turned on for as many of those parts out of the 256 as is determined by the PWM value placed in the PWM register.

The foregoing pulse width modulation operation is unvarying during the running of the motor 10. One thing that does vary, however, is that during the acceleration stage, the frequency of the pulses from the timer 36 gradually increases up to a frequency which results in AC power at 60 Hertz being supplied to the motor 10. Thus, since there are 256 parts within 48 steps of a single cycle, for 60 Hertz this equates to a pulse rate of 737,280 pulses per second from the timer 36. The microprocessor 20 provides signals to the timer 36 over the leads 40 to control this pulse rate. During the acceleration stage, the pulse rate increases and during the deceleration stage the pulse rate decreases. Preferably, as illustrated in FIG. 5, during the acceleration stage the increase in frequency is linear and during the deceleration stage the decrease in frequency is parabolic. Another variable is the RMS voltage applied to the motor 10. This voltage may be constant during the acceleration stage and is constant during the run stage, but decreases during the deceleration stage. Accordingly, during the deceleration stage, the PWM values are reduced by a factor corresponding to the ratio of the frequency of the power applied to the motor 10 to the running frequency of 60 Hertz, thereby lowering the duty cycles and reducing the applied voltage.

It is further been found to be beneficial to stopping the motor for effecting a DC braking at the end of the deceleration stage. Thus, after the frequency has reached zero at the end of the deceleration stage, it has been found effective to set up a fixed (in space) field in the motor windings 30, 32 and 34 for a period of about 80 milliseconds using a PWM value of sixty (60).

Accordingly, there has been disclosed an improved positioning system which utilizes an induction motor to accurately position a cyclicly movable member at a precise location within its movement cycle. It is understood that the above-described embodiment is merely illustrative of the application of the principles of this invention. Numerous other arrangements may be devised by those skilled in the art without departing from the spirit and scope of this invention, as defined by the appended claims.

We claim:

1. A single cycle positioning system utilizing a three phase wye connected induction motor, comprising:
   a source of DC power;
   a movable member coupled to said motor for controlled cyclical movement thereby;
   means for providing a start signal to initiate movement of said member;
   means associated with said member for providing a stop signal when said member is at a predetermined position within its cycle of movement;
   controllable three phase inverter means connected between said source of DC power and the three phase windings of said motor for selectively providing connections between said DC power source and the three phase windings of said motor; and
   control means coupled to receive said start signal and said stop signal for controlling said inverter means, said control means being effective in response to said start signal for controlling said inverter means so as to generate from said source of DC power three substantially sinusoidal phases of AC power which are applied to respective ones of the three phase windings of said motor, said control means being operative in response to said start signal for applying AC power to the motor windings at a frequency which increases from zero up to a predetermined frequency, and thereafter maintaining the frequency of said AC power at said predetermined frequency until receipt of said stop signal, said control means being further effective to maintain the voltage applied to said motor windings at a predetermined value from receipt of said start signal until receipt of said stop signal, and said control means being effective in response to said stop signal for controlling said inverter means to effect a dynamic braking of said motor so that said movable member comes to rest at a desired position within a defined range of said predetermined position.

2. The system according to claim 1 wherein said control means is operative in response to said stop signal for decreasing the frequency of the AC power applied to said motor windings down to zero from said predetermined frequency.

3. The system according to claim 2 wherein said control means is effective after receipt of said stop signal to reduce the voltage applied to said motor windings relative to said predetermined value as a function of the ratio of the applied frequency to the predetermined frequency.

4. The system according to claim 3 wherein said control means includes a programmed microprocessor having a table storing pulse width modulation values used for generating substantially sinusoidal signals for controlling said inverter means, said microprocessor reducing said pulse width modulation values to effect reduction of the voltage applied to said motor windings after receipt of said stop signal.

5. The system according to claim 1 wherein said control means is operative to increase the frequency of said AC power linearly in response to said start signal.

6. The system according to claim 2 wherein said control means is operative to decrease the frequency of said AC power parabolically in response to said stop signal.

7. The system according to claim 2 wherein said control means is operative after the frequency of the AC power has decreased to zero in response to said stop signal for thereafter controlling said inverter means to set up a fixed magnetic field in said motor for a predetermined time.

* * * * *